United States Patent
Chouhan et al.

(10) Patent No.: US 9,942,325 B2
(45) Date of Patent: Apr. 10, 2018

(54) METHODS AND SYSTEMS FOR SELECTING COMPATIBLE RESOURCES IN NETWORKED STORAGE ENVIRONMENTS

(71) Applicant: NETAPP, INC., Sunnyvale, CA (US)

(72) Inventors: Nirdosh Kumar Chouhan, Bangalore (IN); Nibu Habel, Bangalore (IN); Dhanesh Kumar Sharma, Bangalore (IN); Kavya Srinivasan, Bangalore (IN); Akshay Manchale Sridhar, Bangalore (IN)

(73) Assignee: NETAPP, INC., Sunnyvale, CA (US)

( * ) Notice: Subject to any disclaimer, the term of this patent is extended or adjusted under 35 U.S.C. 154(b) by 336 days.

(21) Appl. No.: 14/861,804

(22) Filed: Sep. 22, 2015

(65) Prior Publication Data

US 2017/0085644 A1  Mar. 23, 2017

(51) Int. Cl.
*H04L 29/08* (2006.01)
*G06N 5/02* (2006.01)
*G06N 5/04* (2006.01)
*H04L 12/26* (2006.01)
*G06F 3/06* (2006.01)

(52) U.S. Cl.
CPC ............ *H04L 67/1097* (2013.01); *G06F 3/06* (2013.01); *G06N 5/02* (2013.01); *G06N 5/04* (2013.01); *H04L 43/10* (2013.01)

(58) Field of Classification Search
CPC ..... H04L 41/22; H04L 43/10; H04L 67/1097; G06N 5/02; G06N 5/04
See application file for complete search history.

(56) References Cited

U.S. PATENT DOCUMENTS

| | | | | |
|---|---|---|---|---|
| 7,496,551 B1 * | 2/2009 | Jalagam | ................... | G06N 5/04 706/47 |
| 2004/0267553 A1 * | 12/2004 | Brunton | ............ | G06F 17/30067 718/105 |
| 2009/0187643 A1 * | 7/2009 | Ng | ...................... | H04L 41/0883 709/220 |
| 2014/0143401 A1 * | 5/2014 | Carlen | .................. | G06F 9/5072 709/223 |

\* cited by examiner

*Primary Examiner* — Chirag R Patel
(74) *Attorney, Agent, or Firm* — Klein, O'Neill & Singh, LLP

(57) ABSTRACT

Methods and systems for a networked storage environment are provided. One method includes storing at a storage device by a processor a data structure with information regarding a plurality of compatible software and hardware components configured to operate in a plurality of configurations as part of a storage solution for using resources at a networked storage environment for storing data, where the data structure stores information regarding relationships between a plurality of storage solutions using certain common hardware and software components; receiving a request for a compatible configuration; searching the data structure by the processor and providing a hint based on any existing relationship between components of the plurality of storage solutions and content of the request; and presenting the compatible configuration for using one or more resources of the networked storage environment.

21 Claims, 17 Drawing Sheets

| Add Components 344 | | |
|---|---|---|
| Filter Components | Storage Solution | Snap Manager for Oracle® |
| Browser | Configurations Found: -12 | |
| Host OS [Windows] [HP] | Application Server OS related components<br>List of Windows OS 358 | |
| Host Application [Oracle 9i] [SMO] | Application Software related components<br>Host Application Oracle 9i 360 | |
| Management Package [On Command] | Host Server Hardware 362<br>None | |
| Protocol [FC] [FCOE] [NFS] [iSCSI] | Storage System related components<br>List of Storage Operating System 364 | |
| Snap Drive [SDU] [SDW] | Storage Networking related components<br>FC Protocol | |
| | Other components 368<br>None | |

METHODS AND SYSTEMS FOR SELECTING COMPATIBLE RESOURCES IN NETWORKED STORAGE ENVIRONMENTS

COPYRIGHT NOTICE

A portion of the disclosure herein contains material to which a claim for copyrights is made. The copyright owner, the assignee of this patent application, does not have any objection to the facsimile reproduction of any patent document as it appears in the USPTO patent files or records, but reserves all other copyrights, whatsoever.

TECHNICAL FIELD

The present disclosure relates to networked storage environments, and more particularly, to automated methods and systems for selecting compatible hardware and software components of the networked storage environment.

BACKGROUND

Networked storage environments, for example, storage area networks (SANs) and network attached storage (NAS) use various components for storing and managing data for clients. These components include hardware (for example, host servers, switches, network interface cards, host bus adapters, storage servers, storage devices and arrays) and software (for example, host applications, host operating systems, firmware, backup applications executed by host systems, storage operating systems, application programming interface (APIs) and others). As network storage environments continue to grow, it is desirable for users to efficiently determine a configuration of software and hardware components based on user needs and operating environments.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures:

FIGS. 3C-3D show examples of a graphical user interface for searching for compatible configurations, according to one aspect of the present disclosure;

FIGS. 3E-3G show other examples of a graphical user interface, according to one aspect of the present disclosure;

DETAILED DESCRIPTION

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one aspect, methods and systems for selecting compatible resources in a networked storage environment are provided. One method includes storing at a storage device by a processor a data structure with information regarding a plurality of compatible software and hardware components configured to operate in a plurality of configurations as part of a storage solution for using resources at the networked storage environment for storing data, where the data structure stores information regarding relationships between a plurality of storage solutions using certain common hardware and software components; receiving a request for a compatible configuration; searching the data structure by the processor and providing a hint based on any existing relationship between components of the plurality of storage solutions and content of the request; and presenting the compatible configuration for using one or more resources of the networked storage environment.

Figure 1A:
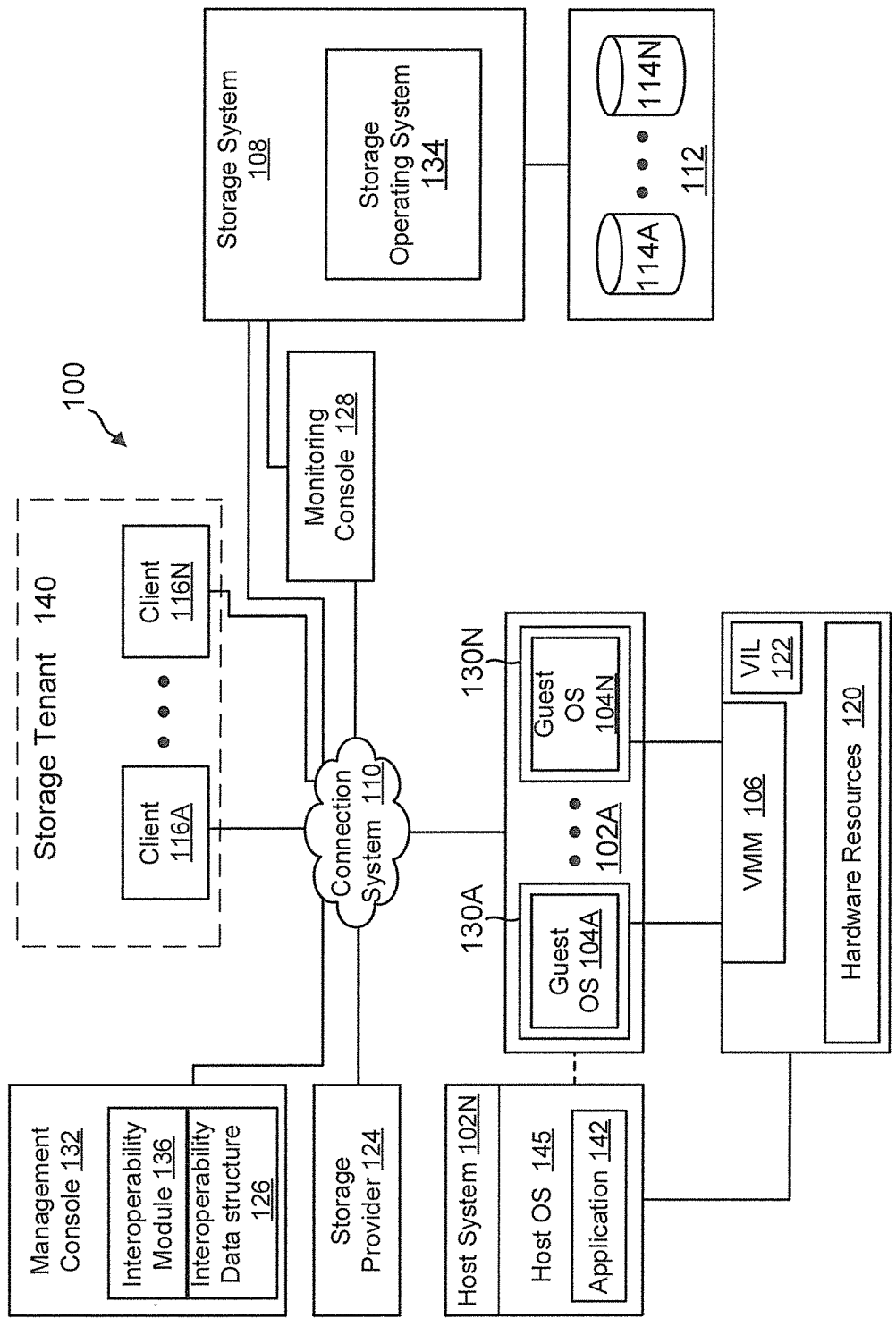
FIG. 1A shows an example of an operating environment for the various aspects disclosed herein.

System 100:

FIG. 1A shows an example of a networked storage environment 100 (also referred to as system 100) having a plurality of hardware and software components that are selected, according to one aspect of the present disclosure. In one aspect, system 100 provides a management console 132 that executes, among other modules, an interoperability module 136. As an example, the interoperability module 136 may be implemented as or include one or more application programming interface (API). The APIs may be implemented as REST APIs, where REST means "Representational State Transfer". REST is a scalable system used for building web services. REST systems/interface may use HTTP (hyper-text transfer protocol) or other protocols for communicating. When implemented as a REST API, the interoperability module 136 receives a request and provides a response to the request. The adaptive aspects described herein are not limited to REST based APIs or any specific API type.

In one aspect, the interoperability module 136 generates or interfaces with an interoperability data structure (may also be referred to as data structure) 126 that may include various objects and data structures. Data structure 126 may be used to store information regarding different components of system 100, relationships between the components, different configurations using various components of system 100 and information regarding storage solutions having one or more configurations. Details of data structure 126 are provided below.

As an example, system 100 may also include a plurality of computing devices 102A-102N (may also be referred to individually as a host platform/system 102 or simply as server 102) communicably coupled to a storage system (or storage server) 108 that executes a storage operating system 134 via a connection system 110 such as a local area network (LAN), wide area network (WAN), the Internet and others. As described herein, the term "communicably coupled" may refer to a direct connection, a network connection, or other connections to enable communication between devices.

As an example, host system 102A may execute a plurality of virtual machines (VMs) in a virtual environment that is described below in detail. Host 102N may execute one or more application 142, for example, a database application (for example, Oracle application), an email application (Microsoft Exchange) and others. Host 102N also executes an operating system 145, for example, a Windows based operating system, Linux, Unix and others (without any derogation of any third party trademark rights). It is noteworthy that host systems 102 may execute different operating systems and applications. These applications may also have different versions. Similarly, although only one instance of storage operating system 134 is shown, the system may have a plurality of storage systems executing different storage operating system types and versions. The various hardware and software components of the host systems and the storage systems may be referred to as resources of system 100.

Clients 116A-116N (may be referred to as client (or user) 116) are computing devices that can access storage space at the storage system 108. A client can be the entire system of a company, a department, a project unit or any other entity. Each client is uniquely identified and optionally, may be a part of a logical structure called a storage tenant 140. The storage tenant 140 represents a set of users (may be referred to as storage consumers) for a storage provider 124 (may also be referred to as a cloud manager, where cloud computing is being utilized). Where a storage provider 124 is being used, the client accesses storage and protection levels through the storage provider. It is noteworthy that the adaptive aspects of the present disclosure are not limited to using a storage provider or a storage tenant and may be implemented for direct client access.

In one aspect, storage system 108 has access to a set of mass storage devices 114A-114N (may be referred to as storage devices 114) within at least one storage subsystem 112. The mass storage devices 114 may include writable storage device media such as magnetic disks, video tape, optical, DVD, magnetic tape, non-volatile memory devices for example, solid state drives (SSDs) including self-encrypting drives, flash memory devices and any other similar media adapted to store information. The storage devices 114 may be organized as one or more groups of Redundant Array of Independent (or Inexpensive) Disks (RAID). The various aspects disclosed are not limited to any particular storage device type or storage device configuration.

Because storage sub-system 112 may include different storage types, it is desirable to be aware which storage device is compatible with a particular storage operating system or storage operating system version. Furthermore, as described below, the storage system 108 and the storage sub-system 112 may include other hardware components, for example, network interface cards, host bus adapters (HBAs), converged network adapters (CNAs), switches, memory controllers and others. These components have different firmware versions and may use different protocols for operation, for example, Fibre Channel, iSCSI (the Small Computer Systems Interface (SCSI) protocol encapsulated over TCP (Transmission Control Protocol)/IP (Internet Protocol)), Fibre Channel over Ethernet (FCOE), Ethernet and others. Thus for a user, for example, a storage administrator, storage architect and others that may desire to build or use a networked storage infrastructure, it is desirable to know how these various components can be configured and if the components are compatible. The interoperability module 136 performs this function, as described below in detail.

Referring back to FIG. 1A, as an example, the storage system 108 may provide a set of logical storage volumes (or logical unit numbers (LUNs)) that presents storage space to clients and VMs for storing information. Each volume may be configured to store data files (or data containers or data objects), scripts, word processing documents, executable programs, and any other type of structured or unstructured data. From the perspective of one of the client systems, each volume can appear to be a single drive. However, each volume can represent storage space in at one storage device, an aggregate of some or all of the storage space in multiple storage devices, a RAID group, or any other suitable set of storage space.

The storage operating system 134 organizes storage space at storage devices 114 as one or more "aggregate", where each aggregate is identified by a unique identifier and a location. Within each aggregate, one or more storage volumes are created whose size can be varied. A qtree, sub-volume unit may also be created within the storage volumes. As a special case, a qtree may be an entire storage volume.

The storage system 108 may be used to store and manage information at storage devices 114 based on a request. The request may be based on file-based access protocols, for example, the Common Internet File System (CIFS) protocol or Network File System (NFS) protocol, over TCP/IP. Alternatively, the request may use block-based access protocols, for example, iSCSI and SCSI encapsulated over Fibre Channel (FCP).

In a typical mode of operation, a client transmits one or more input/output (I/O) commands, such as a CFS or NFS request, over connection system 110 to the storage system 108. Storage system 108 receives the request, issues one or more I/O commands to storage devices 114 to read or write the data on behalf of the client system, and issues a CIFS or NFS response containing the requested data over the network 110 to the respective client system.

Although storage system 108 is shown as a stand-alone system, i.e. a non-cluster based system, in another aspect, storage system 108 may have a distributed architecture; for example, a cluster based system that is described below in detail with respect to FIG. 2.

System 100 may also include one or more monitoring console 128 that interfaces with the storage operating system 134 for sending and receiving performance data for example, latency (i.e. delay) in processing read and write requests, data transfer rates and other information. It is noteworthy that system 100 may include other management applications that are used for provisioning storage, managing devices/resources, managing backups and restore operations (may be referred to as storage services). These applications or specific application versions are compatible with certain hardware and software. It is desirable for a user to know which application type/version may be best suited for a specific networked storage environment. The interoperability module 136 using data structure 126 enables this function, as described below in detail.

As an example, system 100 may also include a virtual machine environment where a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host platform) which may be referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

Host platform 102A includes/provides a virtual machine environment executing a plurality of VMs 130A-130N that may be presented to client computing devices/systems 116A-116N. VMs 130A-130N execute a plurality of guest OS 104A-104N (may also be referred to as guest OS 104) that share hardware resources 120. Application 142 may be executed within VMs 130. As described above, hardware resources 120 may include storage, CPU, memory, I/O devices or any other hardware resource.

In one aspect, host platform 102A interfaces with a virtual machine monitor (VMM) 106, for example, a processor executed Hyper-V layer provided by Microsoft Corporation of Redmond, Wash., a hypervisor layer provided by VMWare Inc., or any other type. VMM 106 presents and manages the plurality of guest OS 104A-104N executed by the host platform 102. The VMM 106 may include or interface with a virtualization layer (VIL) 122 that provides one or more virtualized hardware resource to each OS 104A-104N.

In one aspect, VMM 106 is executed by host platform 102A with VMs 130A-130N. In another aspect, VMM 106 may be executed by an independent stand-alone computing system, referred to as a hypervisor server or VMM server and VMs 130A-130N are presented at one or more computing systems.

It is noteworthy that different vendors provide different virtualization environments, for example, VMware Corporation, Microsoft Corporation and others. Data centers may have hybrid virtualization environments/technologies, for example, Hyper-V and hypervisor based virtual environment. The generic virtualization environment described above with respect to FIG. 1A may be customized depending on the virtual environment to implement the aspects of the present disclosure. Furthermore, VMM 106 (or VIL 122) may execute other modules, for example, a storage driver, network interface and others, the details of which are not germane to the aspects described herein and hence have not been described in detail. The virtualization environment may use different hardware and software components and it is desirable for one to know an optimum/compatible configuration.

Figure 1B:
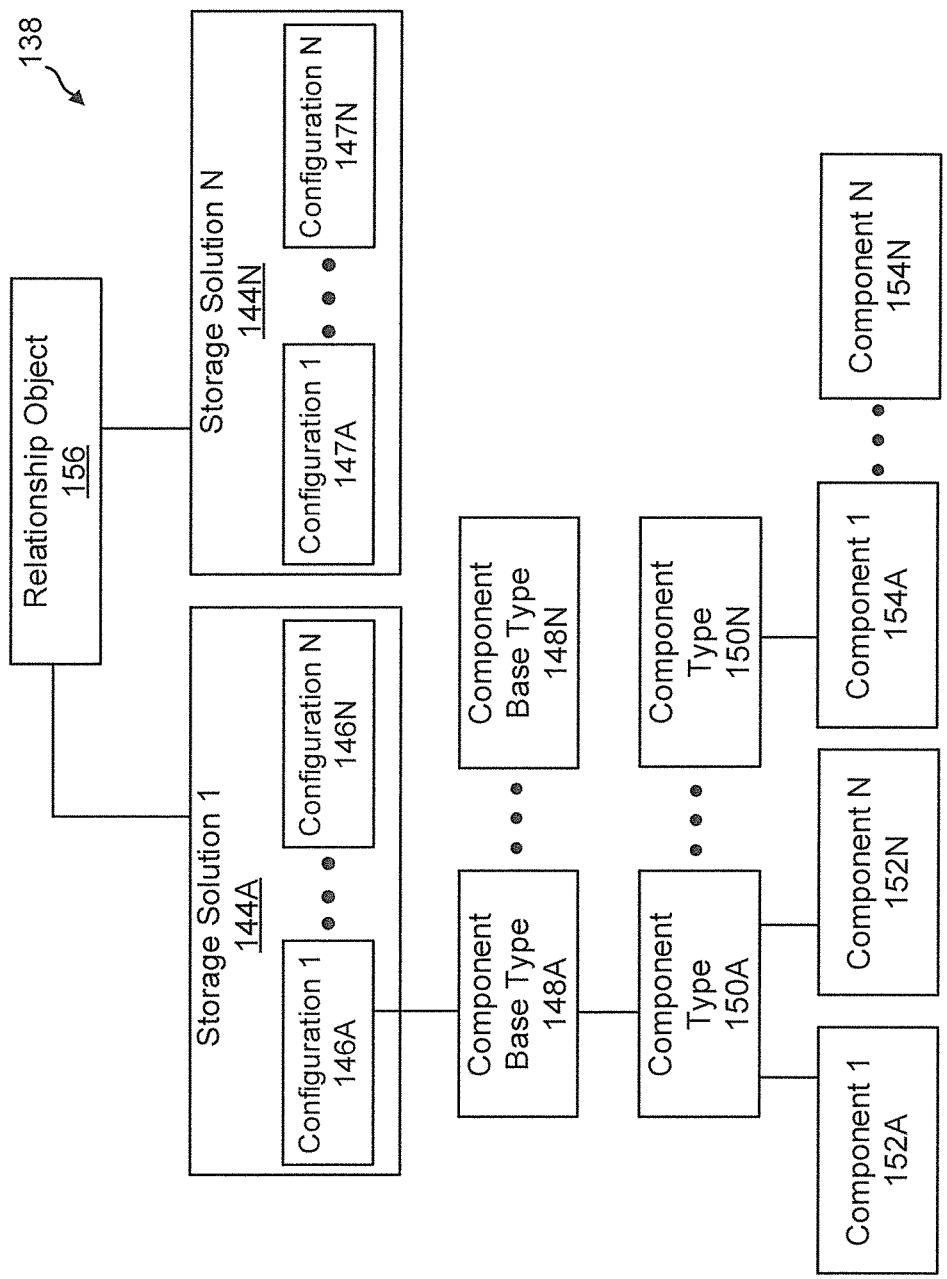
FIG. 1B shows an example of a data structure format, used according to one aspect of the present disclosure.

Data Structure Schema:

FIG. 1B shows an example of a format (or a database schema) for data structure 126 that is used by the interoperability module 136. As an example, the format includes a plurality of storage solution objects 144A-144N, each identifying a storage solution. The term storage solution as used herein may also be referred to as a collection to include multiple configuration and configuration is intended to include a combination of components' that are compatible with each other within a networked storage environment. Each component of a storage solution may be a resource that is used to store and protect data. Storage solution objects 144A-144BN have a unique identifier and name. Each storage solution object may be associated with or include a plurality of configuration objects 146A-146N/1478A-147N that define specific configurations for a particular storage solution. Each configuration has a name, a configuration identifier, a version identifier, an owner of the configuration, if any and other data.

Each configuration may include a plurality of component base type objects 148A-148N that are in turn are associated with a plurality of component type (also referred to as entity type) objects 150A-150N. For example, operating systems in general may be identified by a component base type object, while a host operating system may be a component type. The component base type objects 148A-148N are identified by a base type identifier and a name that identifies a base type. The component type objects 150A-150N are also identified by a unique identifier and name.

Each component type object is associated with a plurality of component (may also be referred to as an entity) objects 152A-152N/154A-154N. Continuing with the above example, where the base type is an operating system and the component type is a host operating system, a Windows operating system may be identified by a component object. Each component object has attributes and properties, for example, a unique identifier, name, version number, vendor identifier for identifying the vendor that provided the component, owner, creating date, modification date and brief description. For example, the attributes for operating systems for host devices having a specific version may include Windows 8.1, Apache Tomcat 8.1m Java 8, servlet 3.1 or JDBC 4.2.

Different solutions may be related to each other with overlapping components. A plurality of solutions that may be connected or have related components may be referred to as a collection group. A relationship object 156 identifies related solutions. The relationship object 156 includes a unique identifier for identifying the relationship.

Figure 1C:
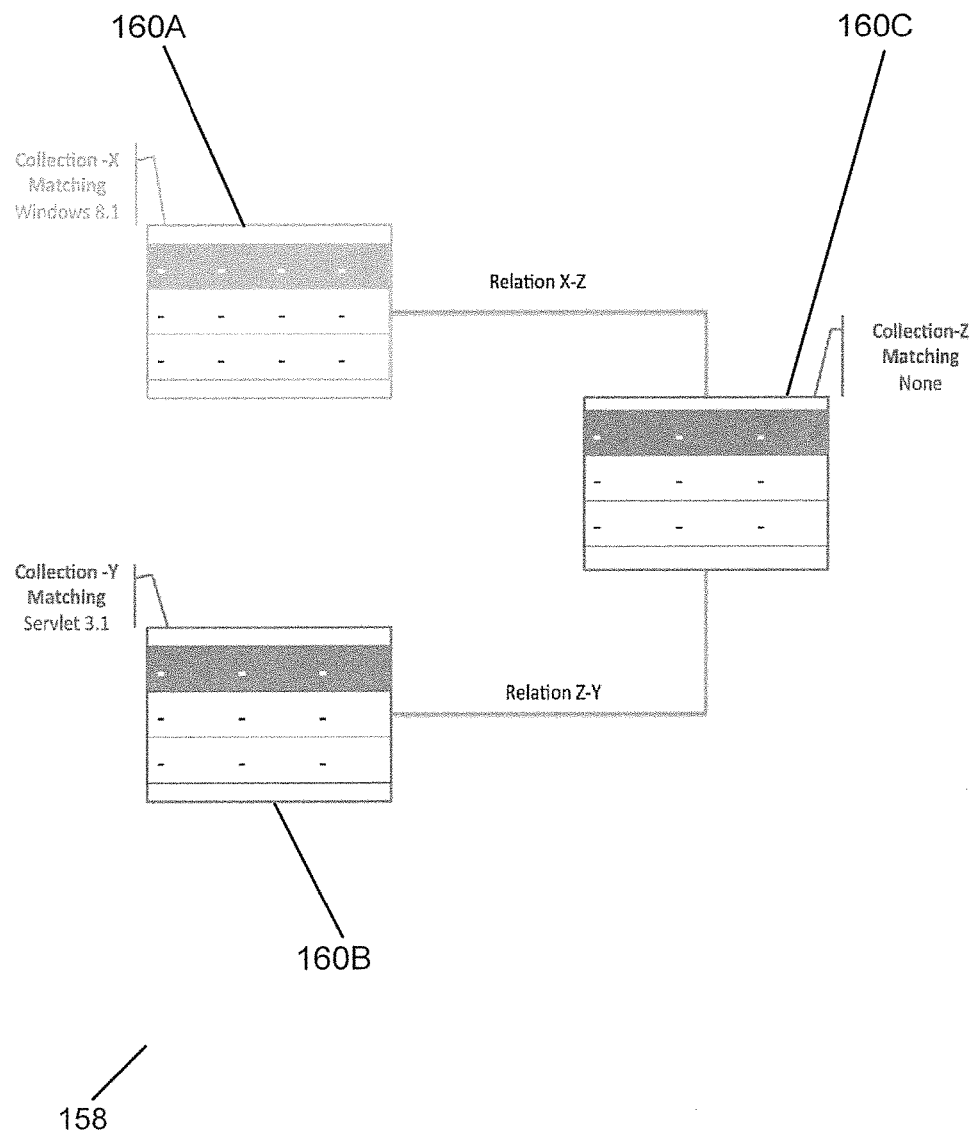
FIG. 1C shows an example of a relationship object, according to one aspect of the present disclosure.

FIG. 1C shows an example 158 with relationships between solutions 160A, 160B and 160C. In this example, solution 160A is related to 160C and solution 160B is related to 160C. As an example, solution 160A uses Windows 8.1 and solution 160B uses Servlet 3.1.

The relationship object 156 may be used to develop a spanning tree for a user that is trying to determine a configuration using certain components. It is noteworthy that although only one relationship object is shown as an example, there may be numerous relationship objects for the plurality of configurations and storage solutions.

In one aspect, the schema of FIG. 1B enables a user to quickly find compatible software and hardware components at the network storage environment 100. A user may begin a search presented within a graphical user interface for a component having a set of attributes/properties.

In one aspect, the interoperability module 136 assists a user in finding compatible configurations based on initial user request/interest, historical requests maintained by the interoperability module 136, historical requests and configurations requested by other users and/or most searched components/configurations stored at data structure 126.

Figure 1D:
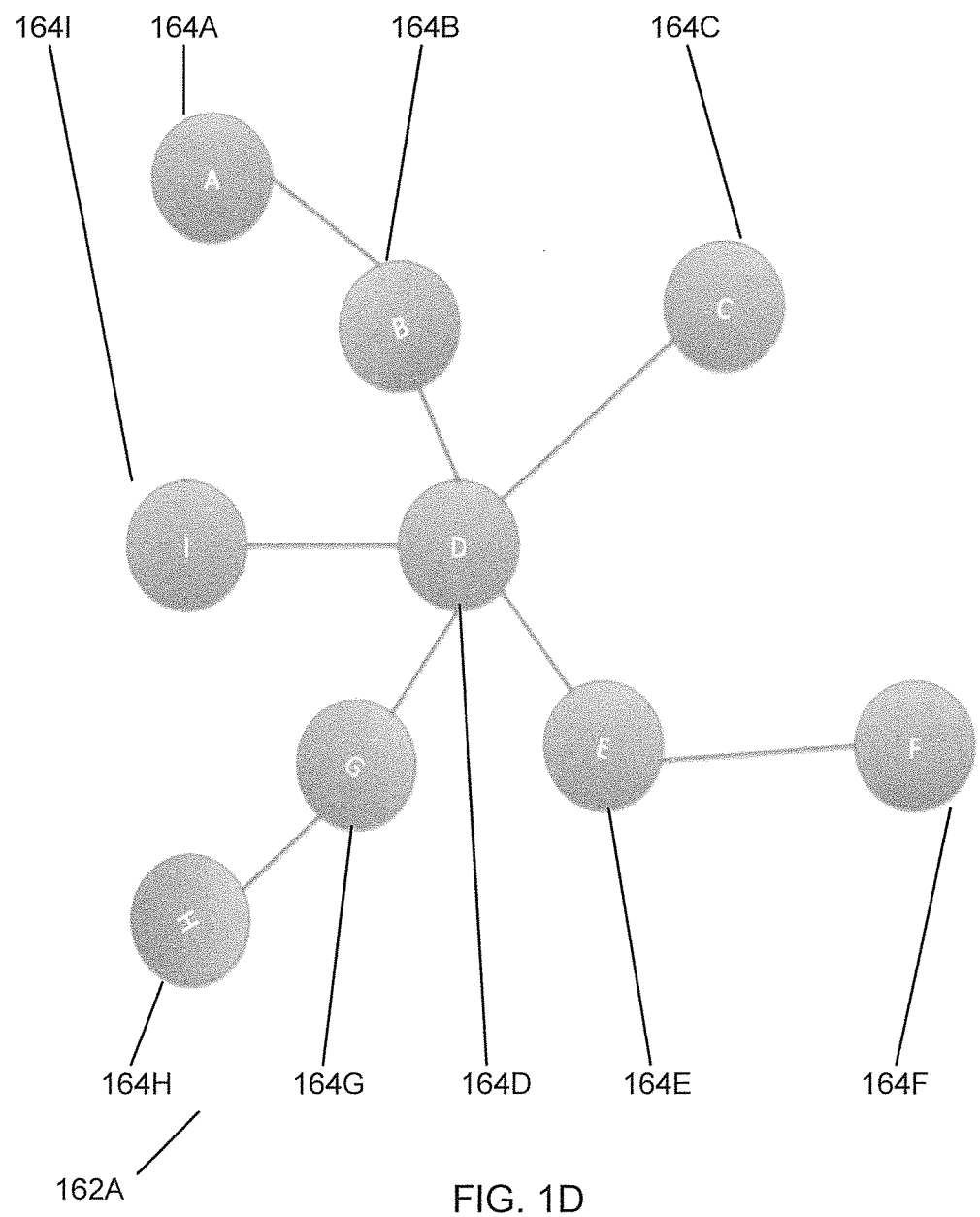
FIGS. 1D-1E show examples of spanning trees of storage solutions, according to one aspect of the present disclosure.
Figure 1E:
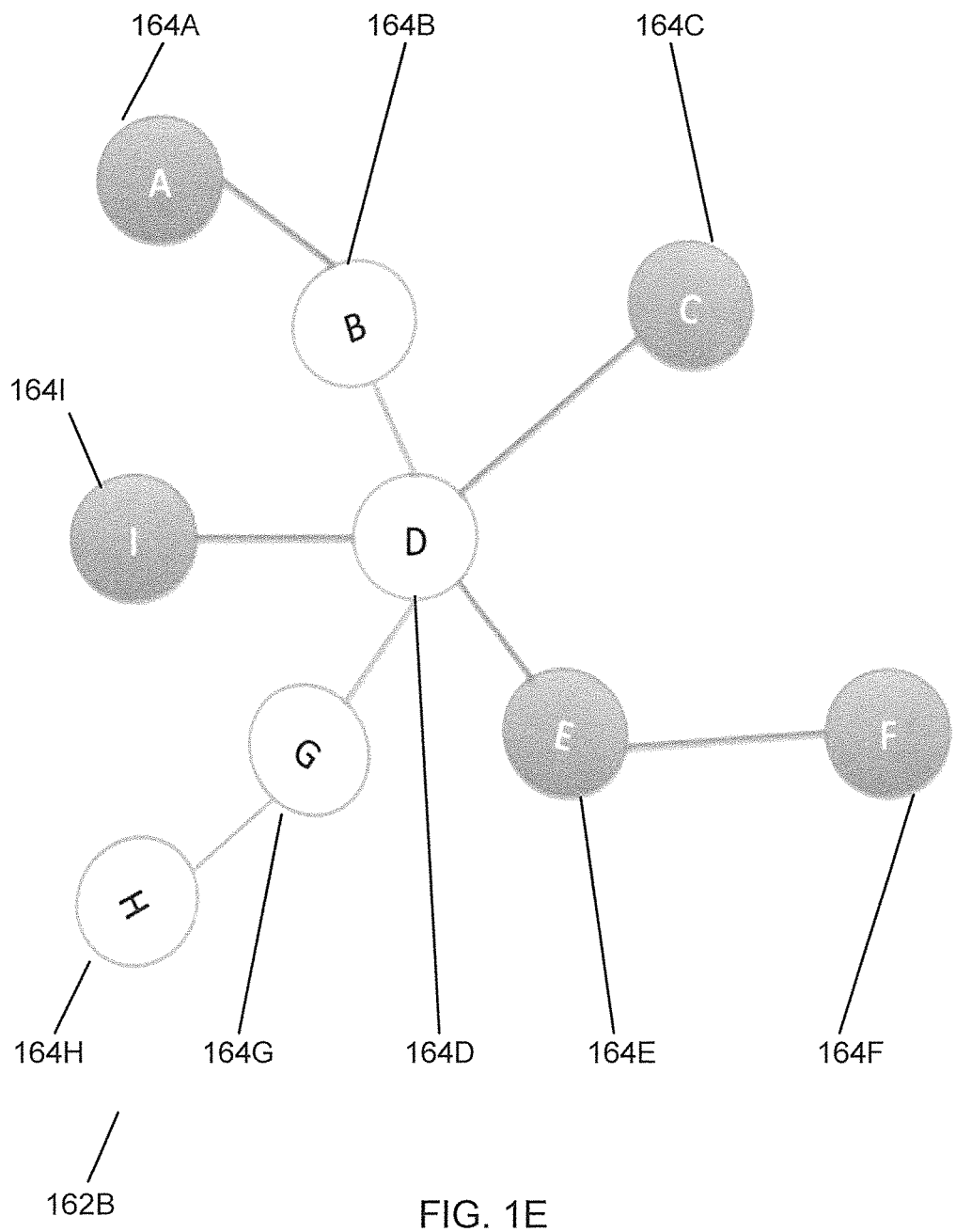

A user's interest may be to find a configuration based on user input or based on the relationship within a collection. In one aspect, interconnected solutions may be represented by a graph. An example of the graph is shown as 162A in FIG. 1D. The graph shows different interconnected solutions 164A-164I. When a user enters a matching criteria from say 164B to 164H (i.e. 164B, 164D, 164G and 164H) then a possible interconnected deployment may be shown as graph 162B of FIG. 1E.

In one aspect, data structure 126 may include the following mappings for generating the spanning tree:

Map[Component, Solution]
Map[Solution, CollectionGroup]
Map[Component Type, Component]
Map[Component, Solution]

In one aspect, a graph may be represented using a vertex (i.e. a solution) and an edge based on a relationship. The following provides processor executable instructions/structure for generating the graph.

Graph {
addNode(Solution)
addEdge(SolutionFrom, SolutionTo)
List<Graph> ConnectedSolutionss( )
hasEdge(SolutionFrom, SolutionTo)
allVertices( )
getEdge(SolutionFrom, SolutionTo)
getNeighbours(SolutionFrom)
getShartestPath(SolutionFrom, SolutionTo)
List<SolutionTo, Distance> getDistanceMap(SolutionFrom)
allEdges( )
}

In one aspect, a component type is determined for a component. A solution is then determined for the component type. A connected collection group where the solutions are related is ascertained and a minimum spanning tree can then be generated. If a direct edge exists between a "solution from" and a "solution to", then it is added. If a direct edge does not exists, then a shortest path is determined for the graph.

It is noteworthy that when a spanning tree is being generated, then a minimum number of edges may be used as factor to remove nodes from the tree at the time of the computing minimum spanning tree for the solution relation that is to be identified. In one aspect, when there are more than one minimum spanning trees which satisfy user inputs, then the process declares that there is an ambiguity. The process for detecting ambiguity and providing useful hints to a user is described below with respect to FIG. 3B.

The various processes executed by the interoperability module 136 using the data structure format of FIG. 1B are described below with respect to FIGS. 3A-3D. Before describing the various process flows, the following describes a clustered storage environment that may be used to implement the adaptive aspects of the present disclosure.

Figure 2:
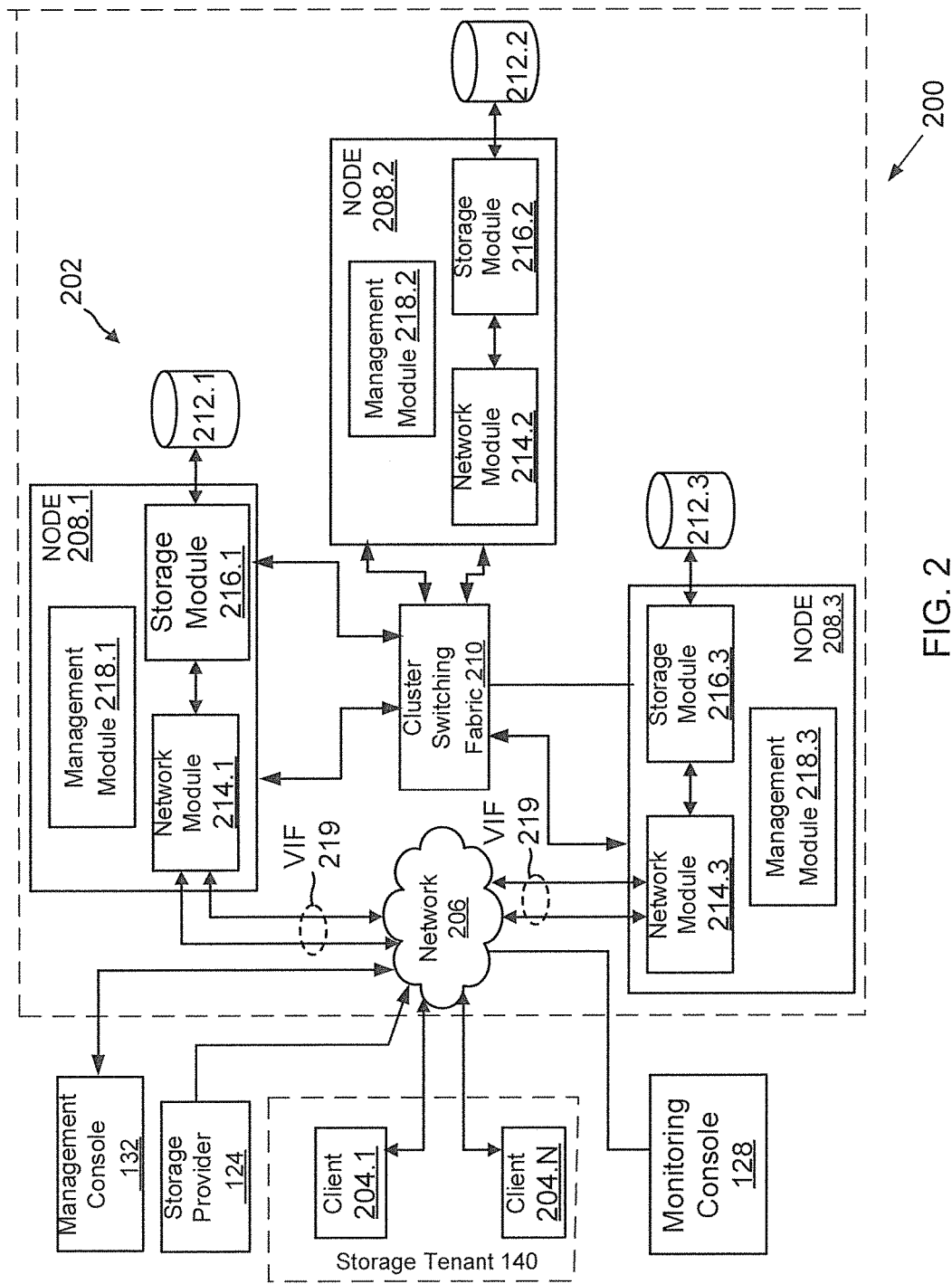
FIG. 2 shows an example of a clustered storage system, used according to one aspect of the present disclosure.

Clustered System:

FIG. 2 shows a cluster based storage environment 200 having a plurality of nodes operating as resources to store data on behalf of clients. System 200 includes the management console 132 with the interoperability module 136 described above in detail.

Storage environment 200 may include a plurality of client systems 204.1-204.N as part of or associated with storage tenant 140, a clustered storage system 202 (similar to storage system 108) and at least a network 206 communicably connecting the client systems 204.1-204.N, the management console 132, the storage provider 124 and the clustered storage system 202. It is noteworthy that these components may interface with each other using more than one network having more than one network device.

The clustered storage system 202 includes a plurality of nodes 208.1-208.3, a cluster switching fabric 210, and a plurality of mass storage devices 212.1-212.3 (may be referred to as 212 and similar to storage device 114). Each of the plurality of nodes 208.1-208.3 is configured to include a network module, a storage module, and a management module, each of which can be implemented as a processor executable module. Specifically, node 208.1 includes a network module 214.1, a storage module 216.1, and a management module 218.1, node 208.2 includes a network module 214.2, a storage module 216.2, and an management module 218.2, and node 208.3 includes an network module 214.3, a storage module 216.3, and an management module 218.3.

The network modules 214.1-214.3 include functionality that enable the respective nodes 208.1-208.3 to connect to one or more of the client systems 204.1-204.N (or the management console 132) over the computer network 206. The network modules handle file network protocol processing (for example, CFS, NFS and/or iSCSI requests). The storage modules 216.1-216.3 connect to one or more of the storage devices 212.1-212.3 and process I/O requests. Accordingly, each of the plurality of nodes 208.1-208.3 in the clustered storage server arrangement provides the functionality of a storage server.

The management modules 218.1-218.3 provide management functions for the clustered storage system 202. The management modules 218.1-218.3 collect storage information regarding storage devices 212 and makes it available to monitoring console 128.

A switched virtualization layer including a plurality of virtual interfaces (VIFs) 219 is provided to interface between the respective network modules 214.1-214.3 and the client systems 204.1-204.N, allowing storage 212.1-212.3 associated with the nodes 208.1-208.3 to be presented to the client systems 204.1-204.N as a single shared storage pool.

The clustered storage system 202 can be organized into any suitable number of storage virtual machines (SVMs) (may be referred to as virtual servers (may also be referred to as "SVMs"), in which each SVM represents a single storage system namespace with separate network access. A SVM may be designated as a resource on system 200. Each SVM has a client domain and a security domain that are separate from the client and security domains of other SVMs. Moreover, each SVM is associated with one or more VIFs 219 and can span one or more physical nodes, each of which can hold one or more VIFs and storage associated with one or more SVMs. Client systems can access the data on a SVM from any node of the clustered system, through the VIFs associated with that SVM.

Each of the nodes 208.1-208.3 is defined as a computing system to provide application services to one or more of the client systems 204.1-204.N. The nodes 208.1-208.3 are interconnected by the switching fabric 210, which, for example, may be embodied as a Gigabit Ethernet switch or any other type of switching/connecting device.

Although FIG. 2 depicts an equal number (i.e., 3) of the network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules. In another aspect, the clustered storage system 202 may only include one network module and storage module.

Each client system 204.1-204.N may request the services of one of the respective nodes 208.1, 208.2, 208.3, and that node may return the results of the services requested by the client system by exchanging packets over the computer network 206, which may be wire-based, optical fiber, wireless, or any other suitable combination thereof.

As shown above the clustered system has various resources with hardware and software components. The interoperability module 136 assists in finding compatible components and configurations, as described below in detail.

Figure 3A:
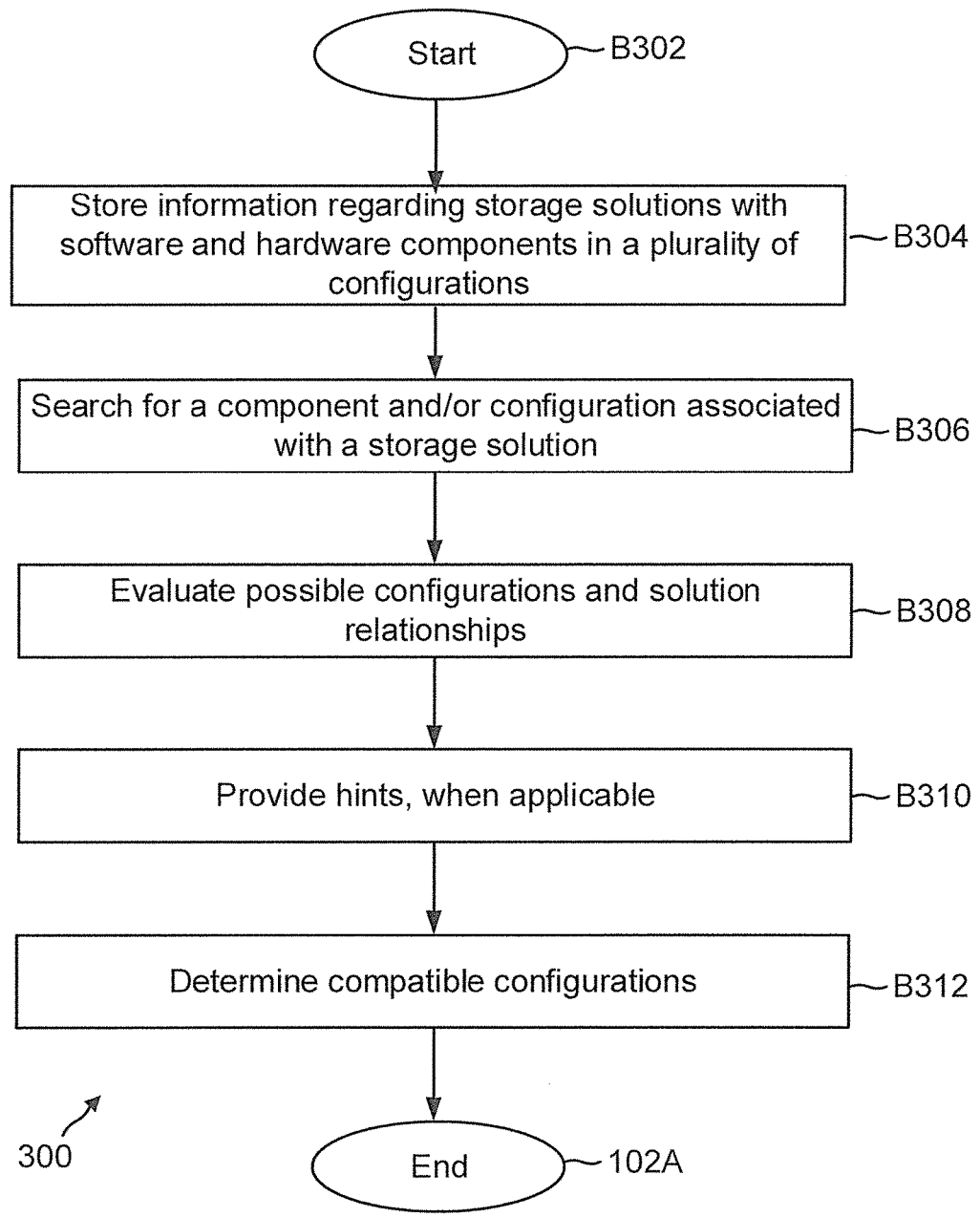
FIG. 3A shows a process for searching for a compatible configuration, according to one aspect of the present disclosure.

Process Flows:

FIG. 3A shows a process 300 executed by the interoperability module 136 using data structure 126 to respond to user requests searching for compatible configurations within a networked storage environment, according to one aspect of the present disclosure. As an example, the process blocks are described with respect to the format of FIG. 1B, structural components of system 100 and clustered networked storage environment 200 that are described above. The process begins in block B302, when the management console 132 is operational and the interoperability module 136 is initialized.

In block B304, a plurality of storage solutions are having a plurality of configurations are stored at data structure 126. The format of FIG. 1B is used to store information regarding the various solutions, configurations and the relationships that may exist between the components, configurations and the solutions. In one aspect, when a new component, hardware or software is deployed in system 100/200, the component provider is presented with an API by the interoperability module 136. The API gathers information regarding the component (i.e. identifier and compatibility information) and then updates data structure 126 using the format of FIG. 1B.

In block B306, the user is presented with a user interface with a search option. The search option enables the user to input a search term. The search term may be a component, a configuration or a storage solution. The user may search for software/hardware using partial details. In one aspect, fuzzy logic may be used to find the best possible match to a query.

In block B308, the various solutions using the component identified by the user are searched and evaluated. The relationship objects are evaluated as well. The user may be provided a hint based on heuristics in block B310. The process for providing a hint is described below with respect to FIG. 3B.

Figure 3B:
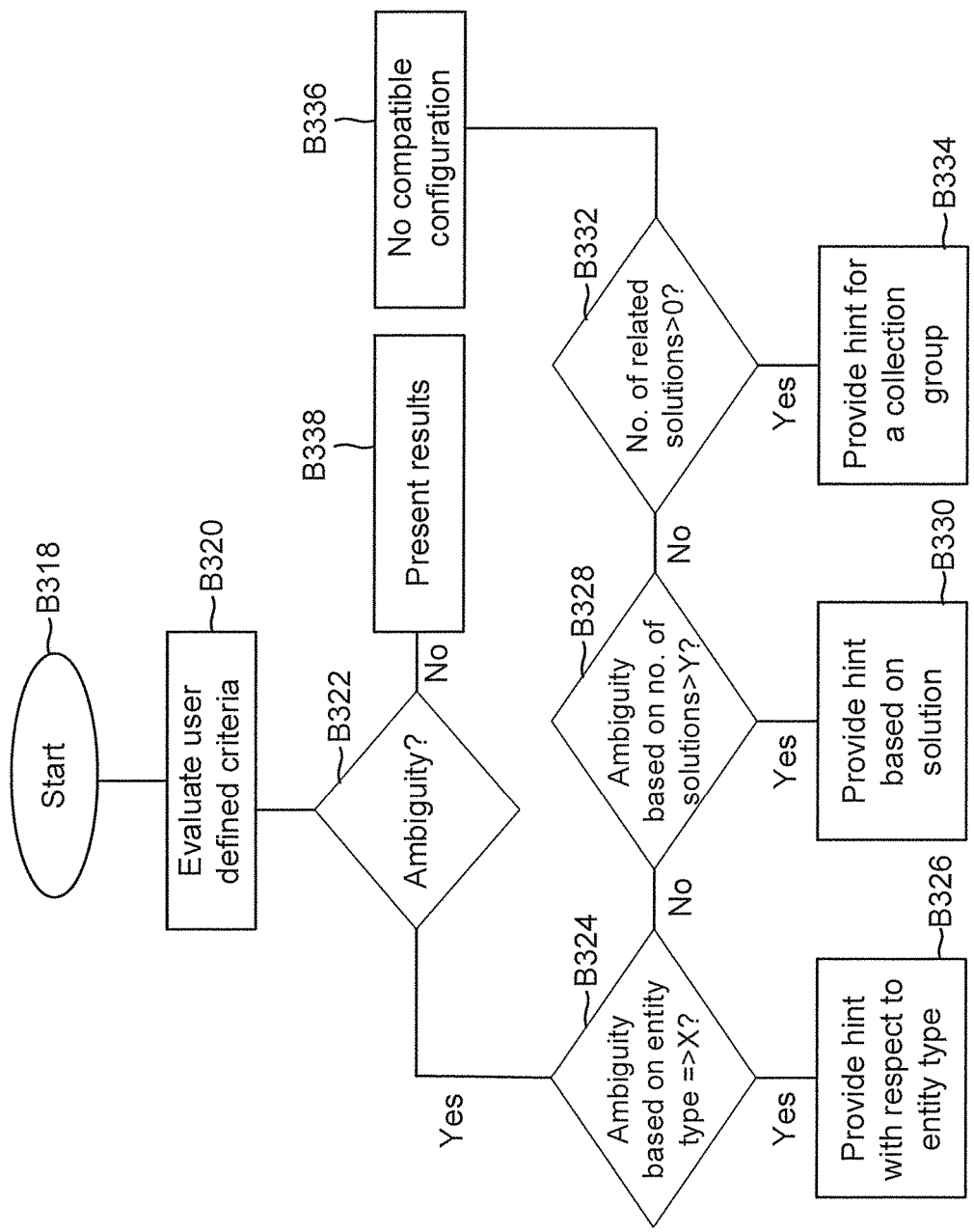
FIG. 3B shows a process for providing hints to a user searching for a compatible configuration, according to one aspect of the present disclosure.
Figure 3C:
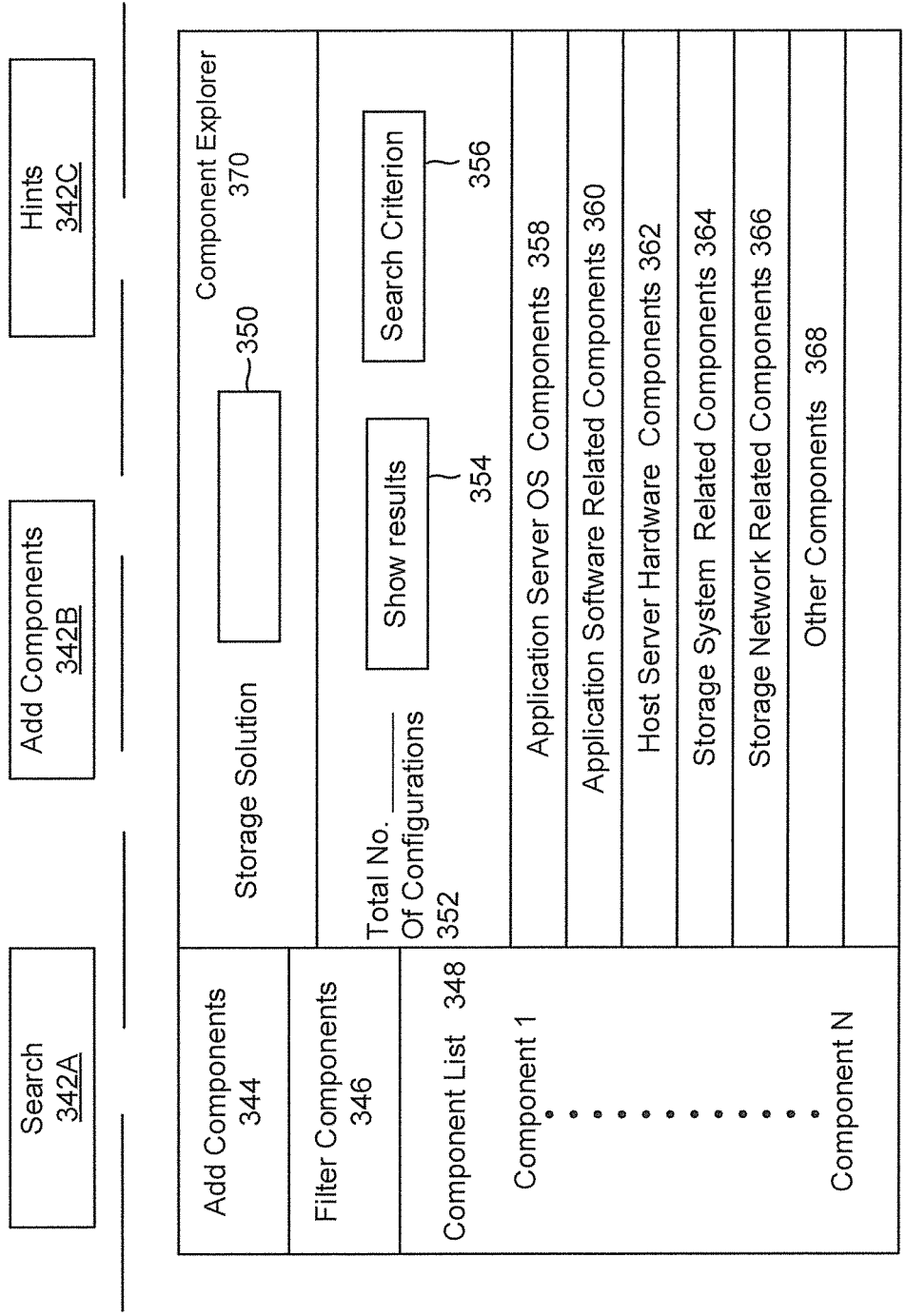

In block B312, compatible and incompatible components are presented via an interface that may be referred to as a component explorer shown in FIG. 3C. In block B314, the user may select an available storage solution with a predefined configuration or create its own configuration based on the options presented by the components explorer.

FIG. 3B shows a process for providing hints to a user during a component/configuration search, according to one aspect of the present disclosure. The process begins in block B318, when a user may start a search for a configuration or a component (may also be referred to as an entity). In block B320, the user defined search criteria for a component and/or a configuration is ascertained using data structure 126. In block B322, the process determines if there is any ambiguity i.e. there is more than one solution for a searched component. If there is any ambiguity, then the process determines if the number of ambiguities is greater than a certain value, X based on a component type. If yes, then the user is provided hints that are associated with the component type. If not, then in block B328, the process determines if the ambiguity is based on a number of solutions i.e. Y number of solutions. If yes, then a hint associated with a solution are provided. If not, then in block B332, the process determines if the ambiguity is based on a collection group i.e. if the collection group is greater than zero. If yes, then in block B334, a hint for a collection group is provided. If not, the process moves to block B336, where no compatible configuration is found.

If there was no ambiguity in block B322, then the interoperability module 136 presents results to the user in block B338.

The following provides an example of providing hints to a user, according to one aspect.

Assume that E represents an Entity (or Component); ET represents a component or entity type; and C represents a Collection (i.e. a solution). Assume that the user enters the following Entities:

E12, E23, E5, E6, E9

Assume that solutions C2, C3, C4 and C5 had the following entities:

C2 has E12, E23

C3 has E9

C4 had E5, E6

C5 had E5, E6

C2, C3, C4 and C5 may be represented by: [C2,C3, [C4,C5]]

Thus a possible configuration may be found in [C2,C3, C4] or [C2,C3,C5]

Figure 1F:
FIG. 1F shows an example of a system used for providing hints to a user, according to one aspect of the present disclosure.

FIG. 1F shows a Venn diagram 166, where C4 includes entity types (ET), ET5, ET6, ET19, ET28, ET27 and C5 includes ET5, ET6, ET25 and ET26. Thus ET5, ET6 and ET19 are common. Entity types that are not common are considered for hints to allow a user to narrow the search for compatible configurations. For example, a user may be provided with hints for ET25 and ET26. Continuing with the Venn diagram and the foregoing example, the following logic may be used by the interoperability module 136 to select an entity type for hints:

HINT_ET (C4)=ALL_ET(C4)−[ALL_ET(C4)∩ALL_ET (C5)]
HINT_ET (C5)=ALL_ET(C5)−[ALL_ET(C4)∩ALL_ET (C5)]
HINT_ET (C4)∈ALL_ET (C4)
HINT_ET (C4)∉ALL_ET (C5)
HINT_ET (C5)∈ALL_ET (C5)
HINT_ET (C5)∉ALL_ET (C4)
HINT_ET (C4)!=∅
HINT_ET (C5)!=∅

As shown above, hints may be distributed with equal probability for choosing an option. Each hint for an entity type may be ordered based on usage pattern for a specific user and user preference. This enables the user to see configurations that are more likely to be useful for the user based on user preferences.

User Interface Examples

FIG. 3C shows an example of graphical user interface (GUI) 340 that may be presented on a display device for a user to search for one or more components and/or configurations, using the data structures 126 and processes described above. The GUI 340 provided by the interoperability module 136 includes a search window 342A where a user may enter a component or entity term. The user is also provided with an option to add components in segment 342B. A hint section 342C prompts the user to select components from segment 344 (Add Components) that is a part of segment 370 (may be referred to as component explorer 370) or may also identify components based on the user defined criterion in segment 342A. It is noteworthy that the search options and component explorer 370 may be presented on a same screen or different screens.

Component explorer 370 includes a segment 350 where a storage solution is provided. The total number of configurations for a specific storage solution is provided in segment 352. By selecting option 352, the various configurations for a solution may be shown and search criteria 356 may be used to filter the displayed configurations.

Component explorer also includes different segments 358, 360, 362, 364, 366 and 368. These segments show the various components when a user adds components using option 344 or filters components using the option 346. The component list 348 provides a listing of various components (shown as component 1-component n).

Segment 358 of the component explorer 370 lists application server operating systems (for example, Windows and others). Segment 360 lists application server software applications (for example, SnapManager for Oracle (an application used for backing up Oracle databases, without derogation of any trademark rights) and others). Segment 362 lists host system hardware components, while segment 364 lists storage system related components, for example, a storage operating system. Segment 366 may list storage network related components, for example, a protocol (Fibre Channel and others). Segment 368 may list other components that are not categorized.

It is noteworthy that the list components and the applicable configurations vary based on the storage solutions. In one aspect, the storage solutions are configured based on user needs and preferences.

In one aspect, the component explorer 370 highlights not only compatible components but also shows which components may not be compatible in a particular configuration.

To effectively use the component explorer, a user can search for configuration by searching for a storage solution, configuration name, components, last modified date and status. To search based on component, the component name is entered in the filter segment 346 (FIG. 3C). Based on the term, a list of components is displayed under segment 348. To add components, option 344 is selected and then the selected component is added within the worksheet pane. For example, when a storage system (Data Ontap®) is added, then component appears under storage system segment 364. A search may be narrowed by adding more components.

In one aspect, search results are displayed in a grid format with configuration details for each result. Based on the displayed result, one can modify, filter, export, view or save the search results. Each row of the search result displays a configuration within a storage solution and each configuration may display hyperlinks to other related storage solutions. This enables a user to view a plurality of storage solution to design a system that best works for the user.

FIG. 3D shows an example of using the component explorer 370, according to one aspect of the present disclosure. A user may elect SnapManager for Oracle (without derogation of any trademark rights) in segment 350. To search for configurations using Windows as a host operating system, the user selects Host OS as the component type and then selects Windows Server 2008 within that selection. To add more components, the user may select the Protocol component type and within that may select FC and then select option 344 to add the protocol. To see the results, the "show result" option is selected. To expand the search based on a specific component, the user may select a hyper link for other solutions, for example, SAN-switches, Snap Drive for Windows (SDW) and others.

In one aspect, the component explorer provides a compatibility summary based on certain percentage of results (for example, 20%) that are non-actionable and another percentage (805) are actionable. This makes the search process efficient for a user rather than a hit and trial mechanism for finding compatible configurations.

Figure 3E:
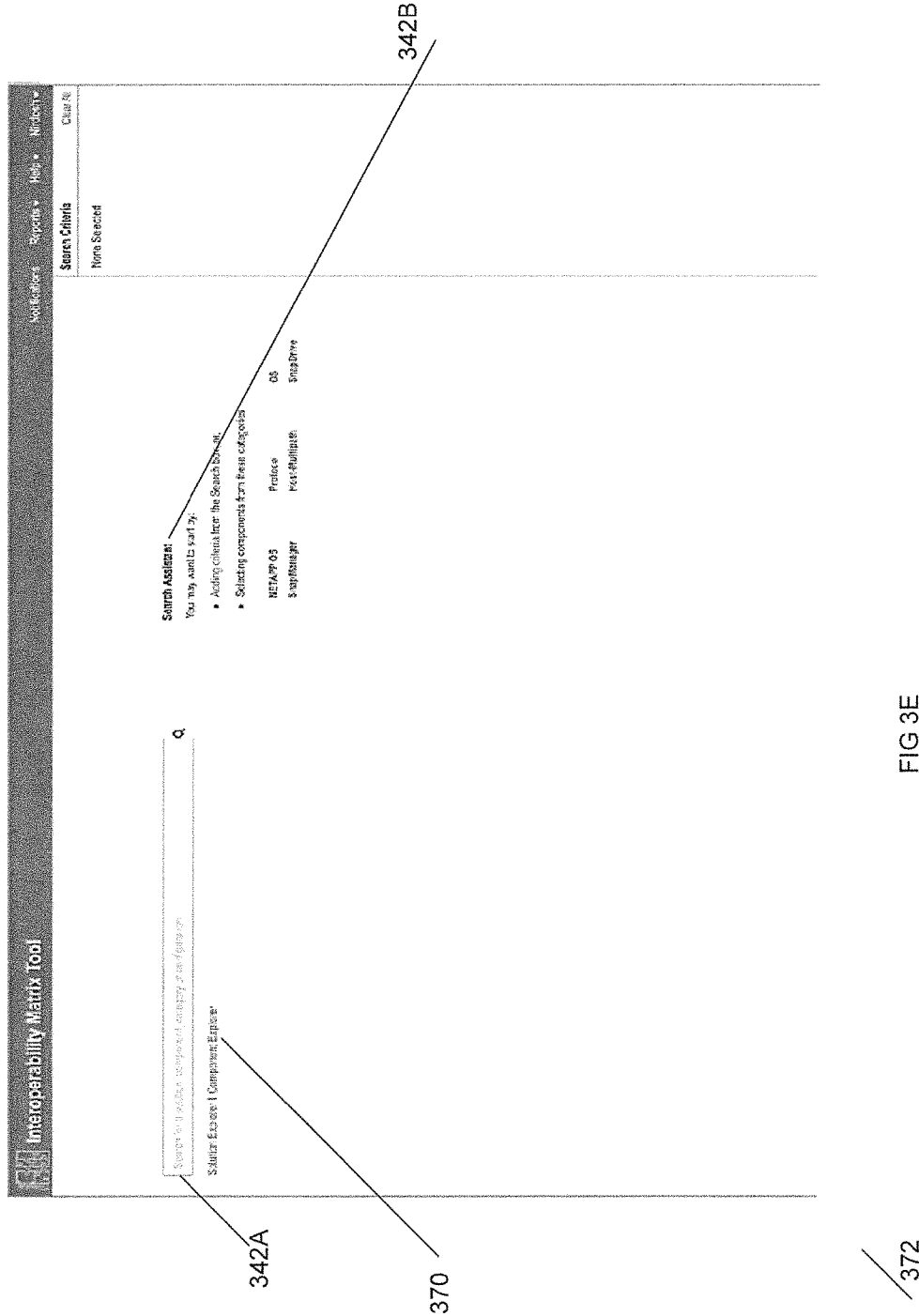

FIG. 3E shows an example of another screenshot 372 that provides the search segment 342A and a search assistant 342B, described above in detail.

Figure 3F:
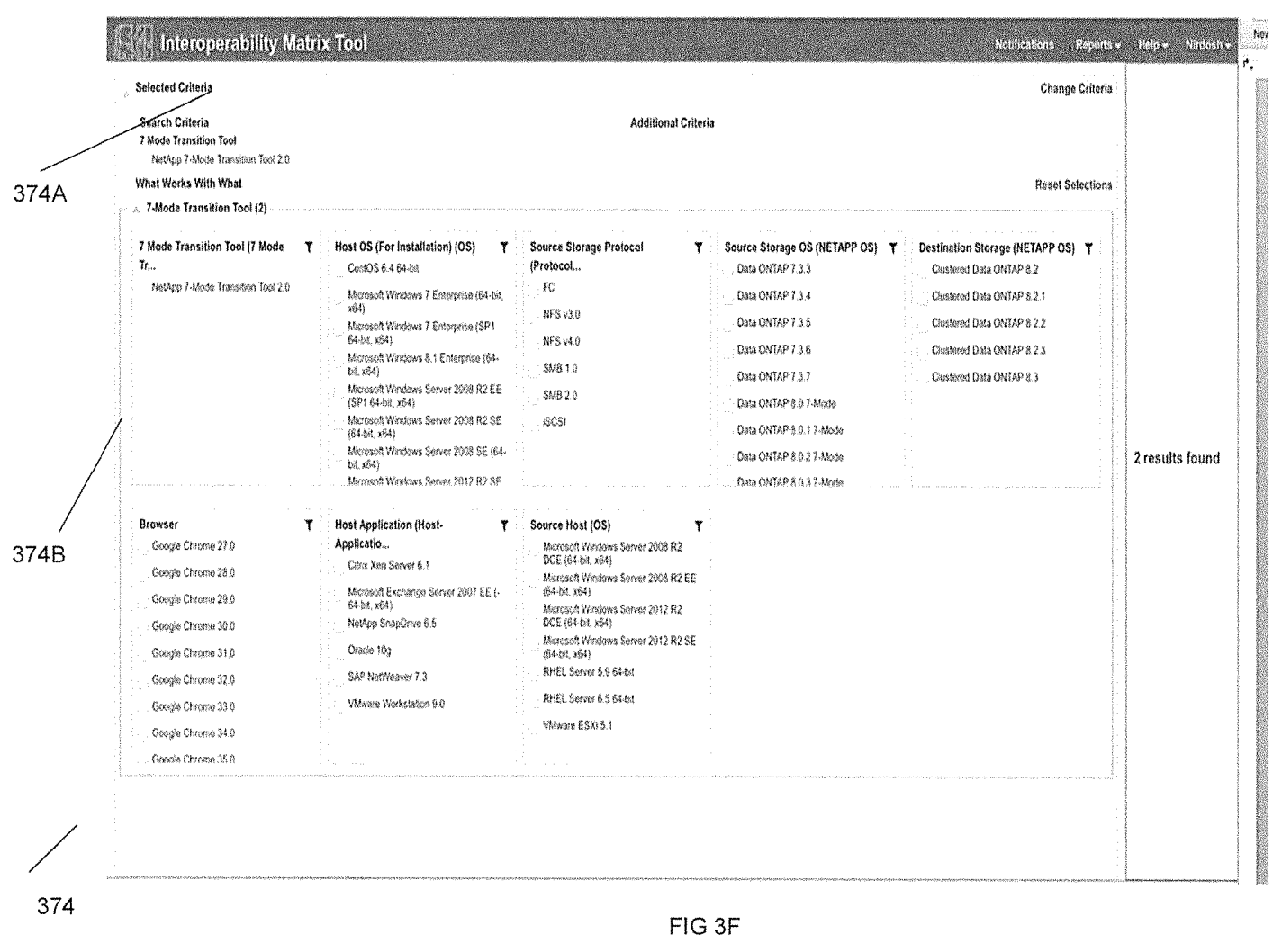
Figure 3G:
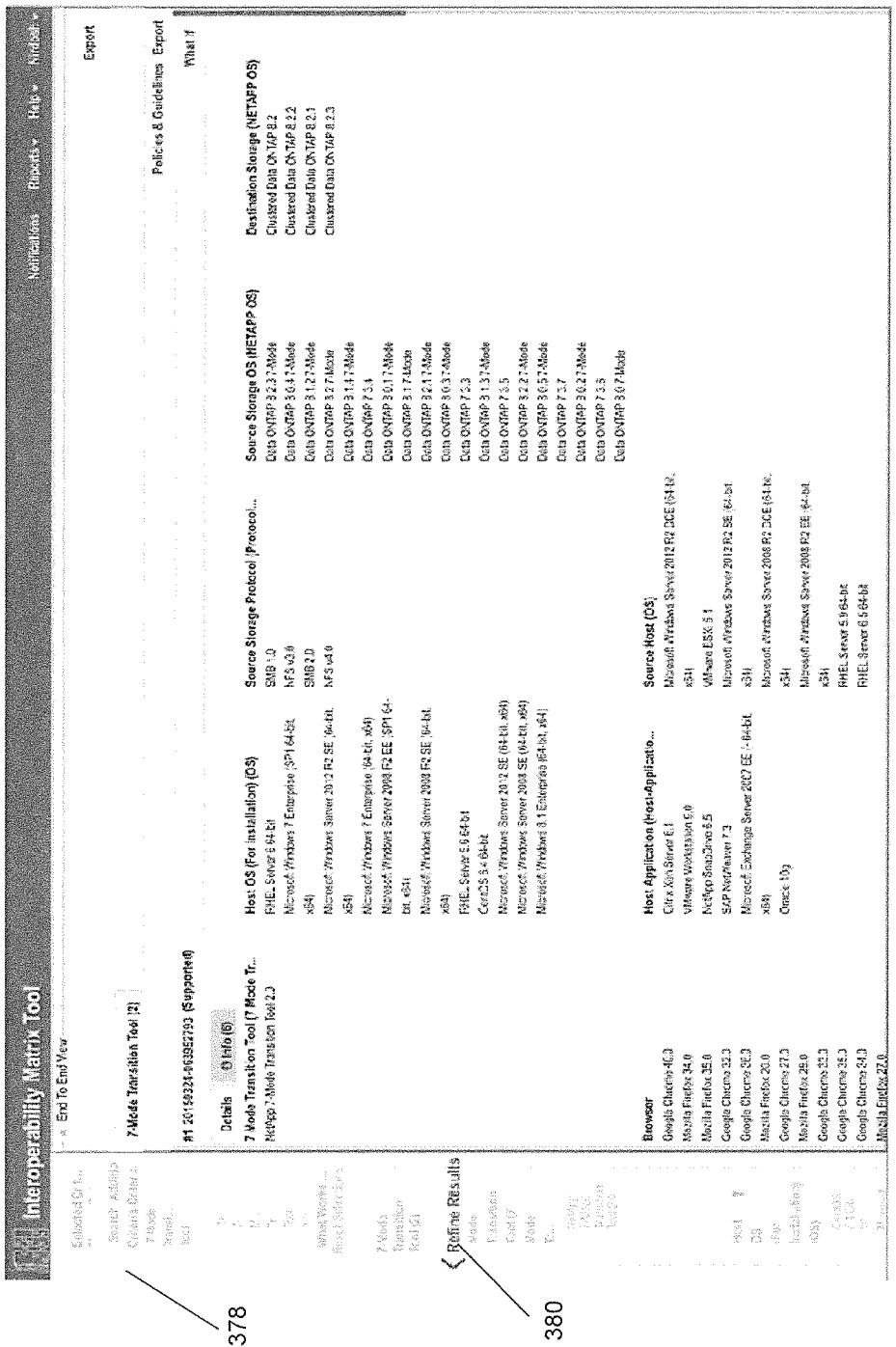

FIG. 3F shows an example of a screenshot 374 that includes segment 374A showing an example of a search criteria with an option for additional search criteria. Segment 374B shows a listing of various components associated with the search criteria. A user may select different options from segment 374B. The results are then shown in FIG. 3G. The additional search criteria is provided in segment 378 (similar to 344, FIG. 3C) and the user may refine the search by selecting components from segment 380 (similar to 346, FIG. 3C).

It is noteworthy that the foregoing screenshots are shown as examples for implementing the various aspects of the present disclosure. The adaptive aspects are not limited to the examples or layout of the screenshots described above.

Figure 4A:
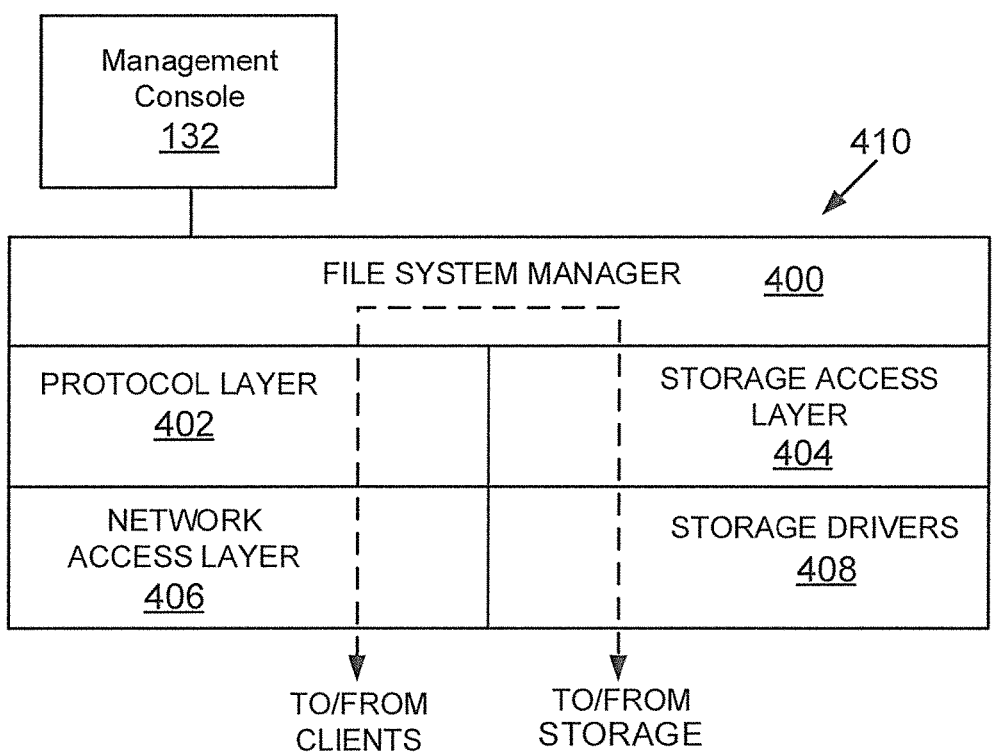
FIG. 4A shows an example of a storage operating system, used according to one aspect of the present disclosure.

Operating System:

FIG. 4A illustrates a generic example of storage operating system 410 (or 134, FIG. 1A) executed by node 208.1, according to one aspect of the present disclosure. The storage operating system 410 interfaces with the management console 132 for receiving information regarding various storage system components. The information is used to build storage solutions and then used by the interoperability module 136, as described above.

In one example, storage operating system 410 may include several modules, or "layers" executed by one or both of network module 214 and storage module 216. These layers include a file system manager 400 that keeps track of a directory structure (hierarchy) of the data stored in storage devices and manages read/write operation, i.e. executes read/write operation on storage in response to client 204.1/204.N requests.

Storage operating system 410 may also include a protocol layer 402 and an associated network access layer 406, to allow node 208.1 to communicate over a network with other systems, such as clients 204.1/204.N. Protocol layer 402 may implement one or more of various higher-level network protocols, such as NFS, CIFS, Hypertext Transfer Protocol (HTTP), TCP/IP and others.

Network access layer 406 may include one or more drivers, which implement one or more lower-level protocols to communicate over the network, such as Ethernet. Interactions between clients' and mass storage devices 212.1-212.3 (or 114) are illustrated schematically as a path, which illustrates the flow of data through storage operating system 410.

The storage operating system 410 may also include a storage access layer 404 and an associated storage driver layer 408 to allow Storage module 216 to communicate with a storage device. The storage access layer 404 may implement a higher-level storage protocol, such as RAID (redundant array of inexpensive disks), while the storage driver layer 408 may implement a lower-level storage device access protocol, such as FC or SCSI. The storage driver layer 408 may maintain various data structures (not shown) for storing information regarding storage volume, aggregate and various storage devices.

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 4B:
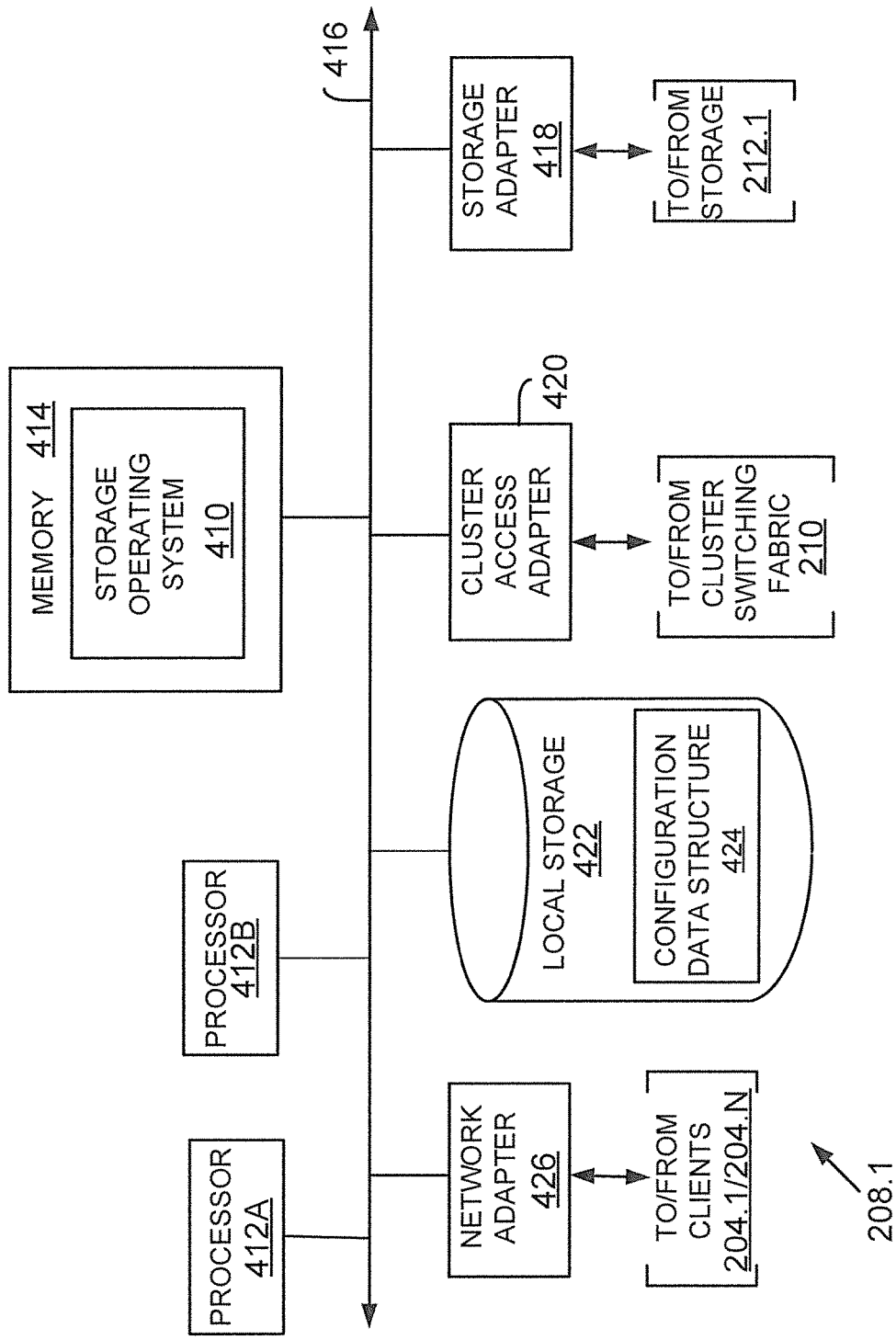
FIG. 4B shows an example of a storage system node, according to one aspect of the present disclosure.

Storage System Node:

FIG. 4B is a block diagram of a node 208.1 that is illustratively embodied as a storage system comprising of a plurality of processors 412A and 412B, a memory 414, a network adapter 426, a cluster access adapter 420, a storage adapter 418 and local storage 422 interconnected by a system bus 416. Node 208.1 may be used to provide configuration information regarding various hardware and software components to management console 132. The information is then stored at data structure 126 for executing the process flows described above.

Processors 412A-412B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The local storage 422 comprises one or more storage devices utilized by the node to locally store configuration information for example, in a configuration data structure 424.

The cluster access adapter 420 comprises a plurality of ports adapted to couple node 208.1 to other nodes of cluster 100. In the illustrative aspect, Ethernet may be used as the clustering protocol and interconnect media, although it will be apparent to those skilled in the art that other types of protocols and interconnects may be utilized within the cluster architecture described herein. In alternate aspects where the network modules and Storage modules are implemented on separate storage systems or computers, the cluster access adapter 420 is utilized by the network/storage module for communicating with other network/storage modules in the cluster 100.

Each node 208.1 is illustratively embodied as a dual processor storage system executing a storage operating system 410 (similar to 134, FIG. 1) that preferably implements a high-level module, such as a file system, to logically organize the information as a hierarchical structure of named directories and files on storage 212.1. However, it will be apparent to those of ordinary skill in the art that the node 208.1 may alternatively comprise a single or more than two processor systems. Illustratively, one processor 412A executes the functions of the network module 214 on the node, while the other processor 412B executes the functions of the storage module 216.

The memory 414 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the disclosure described herein.

The storage operating system 410 portions of which is typically resident in memory and executed by the processing elements, functionally organizes the node 208.1 by, inter alia, invoking storage operation in support of the storage service implemented by the node.

The network adapter 426 comprises a plurality of ports adapted to couple the node 208.1 to one or more clients 204.1/204.N over point-to-point links, wide area networks, virtual private networks implemented over a public network (Internet) or a shared local area network. The network adapter 426 thus may comprise the mechanical, electrical and signaling circuitry needed to connect the node to the network. Illustratively, the computer network 206 may be embodied as an Ethernet network or a Fibre Channel network. Each client 204.1/204.N may communicate with the node over network 206 by exchanging discrete frames or packets of data according to pre-defined protocols, such as TCP/IP.

The storage adapter 418 cooperates with the storage operating system 410 executing on the node 208.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on storage device 212.1. The storage adapter 418 comprises a plurality of ports having input/output (I/O) interface circuitry that couples to the storage devices over an I/O interconnect arrangement, such as a conventional high-performance, FC link topology.

Figure 5:
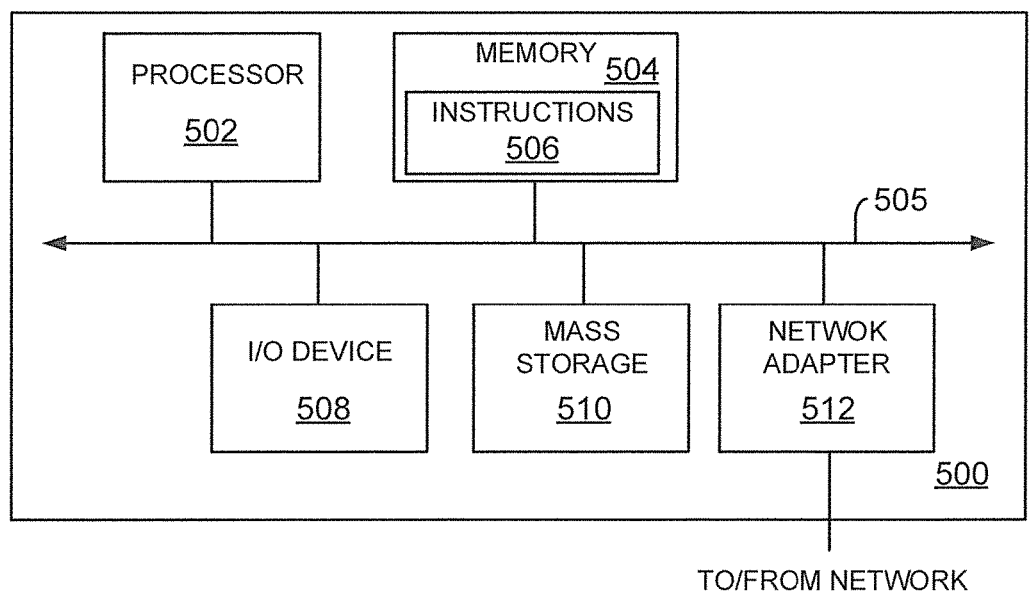
FIG. 5 shows an example of a processing system, used according to one aspect of the present disclosure.

Processing System:

FIG. 5 is a high-level block diagram showing an example of the architecture of a processing system 500 that may be used according to one aspect. The processing system 500 can represent host system 102, management console 132, monitoring console 128, clients 116, 204 or storage system 108. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement the process steps of FIGS. 3A and 3B described above may reside in and execute (by processors 502) from memory 504.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks. The network adapter 512 provides the processing system 500 with the ability to communicate with remote devices (e.g., storage servers) over a network and may be, for example, an Ethernet adapter, a Fibre Channel adapter, or the like.

The processing system 500 also includes one or more input/output (I/O) devices 508 coupled to the bus system 505. The I/O devices 508 may include, for example, a display device, a keyboard, a mouse, etc.

Thus, a method and apparatus for providing compatible configurations for using resources in a networked storage environment have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
storing at a storage device by a processor a data structure with information regarding a plurality of compatible software and hardware components configured to operate in a plurality of configurations as part of a storage solution for using resources at a networked storage environment for storing data, where the data structure stores information regarding relationships between a plurality of storage solutions using certain common hardware and software components in various configurations in a relationship object;
receiving a request for a compatible configuration;
searching the data structure by the processor and providing a hint based on any existing relationship between components of the plurality of storage solutions and content of the request; and
presenting the compatible configuration for using one or more resources of the networked storage environment with information regarding compatible components and information regarding any incompatible component; wherein the compatible configuration is generated from one of a predefined configuration and a customized configuration based on the presented information regarding compatible and incompatible components.

2. The method of claim 1, wherein the networked storage environment includes at least a host computing device executing an operating system and a host application, a network switching device and a storage system executing a storage operating system for storing the data at a storage device on behalf of the host computing device.

3. The method of claim 2, wherein the hint is for reducing a number of component types, when the request results in more than a certain number of component types.

4. The method of claim 2, wherein the hint is for reducing a number of storage solutions, when the request results in more than a certain number of storage solutions.

5. The method of claim 2, wherein the hint is for reducing a number of related storage solutions, when the request results in certain number of related solutions.

6. The method of claim 1, wherein the request provides a component identifier identifying a component.

7. The method of claim 1, wherein the request provides a configuration identifier identifying a configuration.

8. A non-transitory, machine readable medium having stored thereon instructions comprising machine executable code which when executed by a machine, causes the machine to:
> store at a storage device by a processor a data structure with information regarding a plurality of compatible software and hardware components configured to operate in a plurality of configurations as part of a storage solution for using resources at a networked storage environment for storing data, where the data structure stores information regarding relationships between a plurality of storage solutions using certain common hardware and software components in various configurations in a relationship object;
> receive a request for a compatible configuration;
> search the data structure by the processor and providing a hint based on any existing relationship between components of the plurality of storage solutions and content of the request; and
> present the compatible configuration for using one or more resources of the networked storage environment with information regarding compatible components and information regarding any incompatible component; wherein the compatible configuration is generated from one of a predefined configuration and a customized configuration based on the presented information regarding compatible and incompatible components.

9. The storage medium of claim 8, wherein the networked storage environment includes at least a host computing device executing an operating system and a host application, a network switching device and a storage system executing a storage operating system for storing the data at a storage device on behalf of the host computing device.

10. The storage medium of claim 9, wherein the hint is for reducing a number of component types, when the request results in more than a certain number of component types.

11. The storage medium of claim 9, wherein the hint is for reducing a number of storage solutions, when the request results in more than a certain number of storage solutions.

12. The storage medium of claim 9, wherein the hint is for reducing a number of related storage solutions, when the request results in certain number of related solutions.

13. The storage medium of claim 8, wherein the request provides a component identifier identifying a component.

14. The storage medium of claim 8, wherein the request provides a configuration identifier identifying a configuration.

15. A system, comprising:
> a memory containing machine readable medium comprising machine executable code having stored thereon instructions; and a processor module coupled to the memory, the processor module configured to execute the machine executable code to:
> store at a storage device by the processor a data structure with information regarding a plurality of compatible software and hardware components configured to operate in a plurality of configurations as part of a storage solution for using resources at a networked storage environment for storing data, where the data structure stores information regarding relationships between a plurality of storage solutions using certain common hardware and software components in various configurations in a relationship object;
> receive a request for a compatible configuration;
> search the data structure by the processor and providing a hint based on any existing relationship between components of the plurality of storage solutions and content of the request; and
> present the compatible configuration for using one or more resources of the networked storage environment with information regarding compatible components and information regarding any incompatible component; wherein the compatible configuration is generated from one of a predefined configuration and a customized configuration based on the presented information regarding compatible and incompatible components.

16. The system of claim 15, wherein the networked storage environment includes at least a host computing device executing an operating system and a host application, a network switching device and a storage system executing a storage operating system for storing the data at a storage device on behalf of the host computing device.

17. The system of claim 16, wherein the hint is for reducing a number of component types, when the request results in more than a certain number of component types.

18. The system of claim 16, wherein the hint is for reducing a number of storage solutions, when the request results in more than a certain number of storage solutions.

19. The system of claim 16, wherein the hint is for reducing a number of related storage solutions, when the request results in certain number of related solutions.

20. The system of claim 15, wherein the request provides a component identifier.

21. The system of claim 15, wherein the request provides a configuration identifier.

* * * * *